(No Model.)
A. J. CHAPEL.
SASH OPERATOR.
No. 463,095. Patented Nov. 10, 1891.
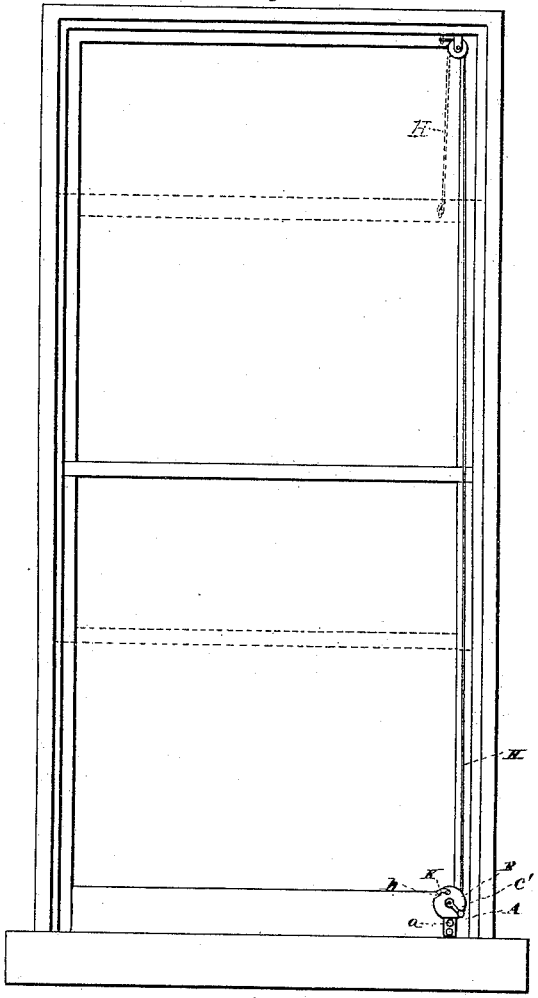
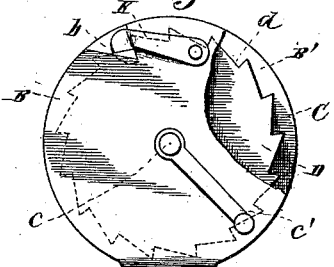
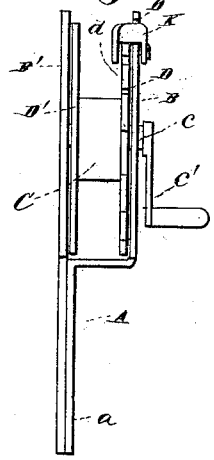
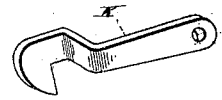
WITNESSES:
Chas L. Taylor
Phill Masi
INVENTOR
Asa J. Chapel
BY E. W. Anderson
his ATTORNEY.
THE NORRIS PETERS CO., PHOTO-LITHO., WASHINGTON, D. C.

UNITED STATES PATENT OFFICE.

ASA J. CHAPEL, OF EUREKA SPRINGS, ARKANSAS.

SASH-OPERATOR.

SPECIFICATION forming part of Letters Patent No. 463,095, dated November 10, 1891.

Application filed April 29, 1891. Serial No. 390,974. (No model.)

*To all whom it may concern:*

Be it known that I, ASA J. CHAPEL, a citizen of the United States, and a resident of Eureka Springs, in the county of Carroll and State of Arkansas, have invented certain new and useful Improvements in Sash-Elevators for Windows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a front elevation. Fig. 2 is a front view of the bracket. Fig. 3 is a side view of same, and Fig. 4 is a detail view.

This invention has relation to certain new and useful improvements in sash-elevators; and it consists in the construction hereinafter described.

In the accompanying drawings, the letter A designates a bracket consisting of the perforated attaching portion $a$ and the disk-shaped arms B B′, parallel to each other and having loosely hung therein a spool C. This spool has the disks D D′ secured to its ends, the disk D having the ratchet-teeth $d$ on its circumferential edge. This bracket is fastened to the bottom portion of the lower sash. A wire H is connected to the spool and runs through a little pulley at the top of the window and thence passes to and is connected to the upper portion of the upper sash. The outer end of the spool-shaft $c$ is provided with a small crank $c'$, and by operating this crank the wire will be wound upon the spool to raise the upper sash or unwound to permit the sash to drop.

A pawl K is secured to the disk B and is adapted to engage one of the teeth $d$ on the disk D, through the slot $b$ for the purpose of locking the spool and holding the sash at the desired elevation.

Having thus described my invention, what I claim as new, and desire to secure by Letters Patent, is—

The herein-described ratchet device for sash-balances, comprising the bracket consisting of the perforated attaching portion $a$, the parallel disk-shaped arms, the spool having bearings in and hung between said arms, said spool having the disks D and D′ at its respective ends, the disk D, having ratchet-teeth on its circumferential ends, a pawl K, pivoted to one of said parallel disks and adapted to engage any one of the ratchet-teeth through a slot in said disk, one end of the spool-shaft being projected through said disk D and carrying a crank, substantially as specified.

In testimony whereof I affix my signature in presence of two witnesses.

ASA J. CHAPEL.

Witnesses:
W. M. BROWN,
R. B. RAY.